Sept. 15, 1925.
E. H. CHAPPUIS
POULTRY EQUIPMENT
Filed Jan. 29, 1924
1,553,749
5 Sheets-Sheet 1
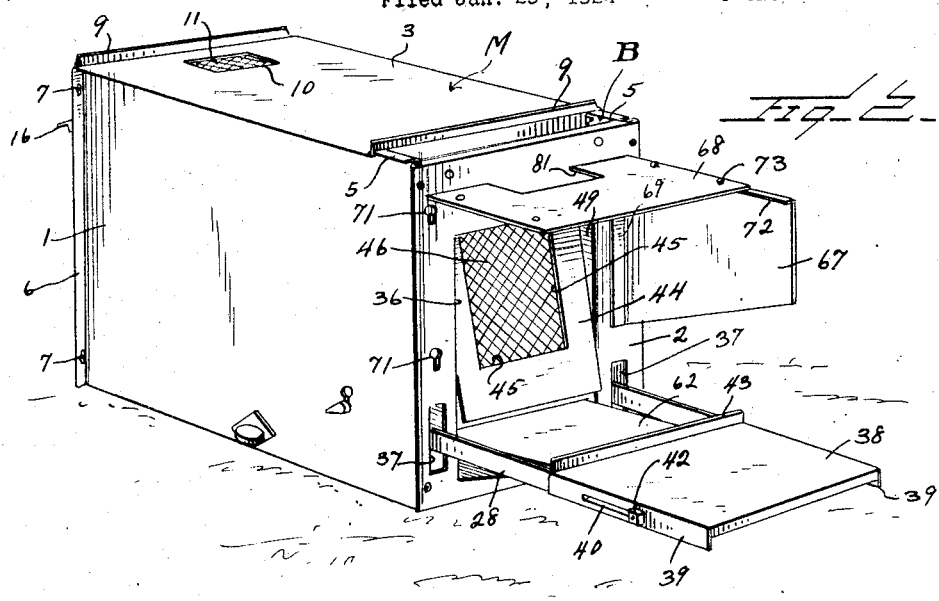
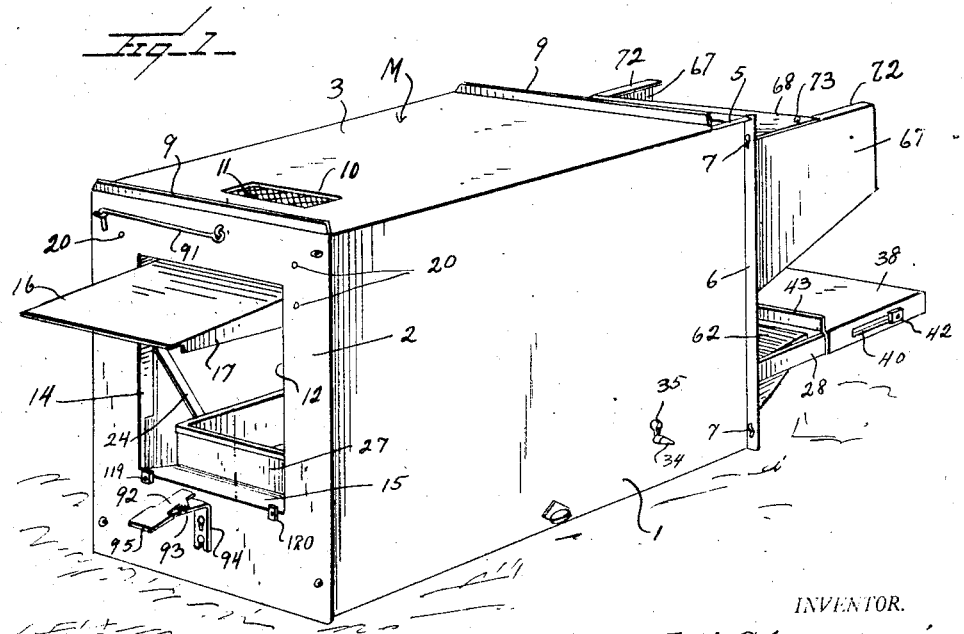
INVENTOR.
E. H. Chappuis
BY Watson E. Coleman
ATTORNEY.

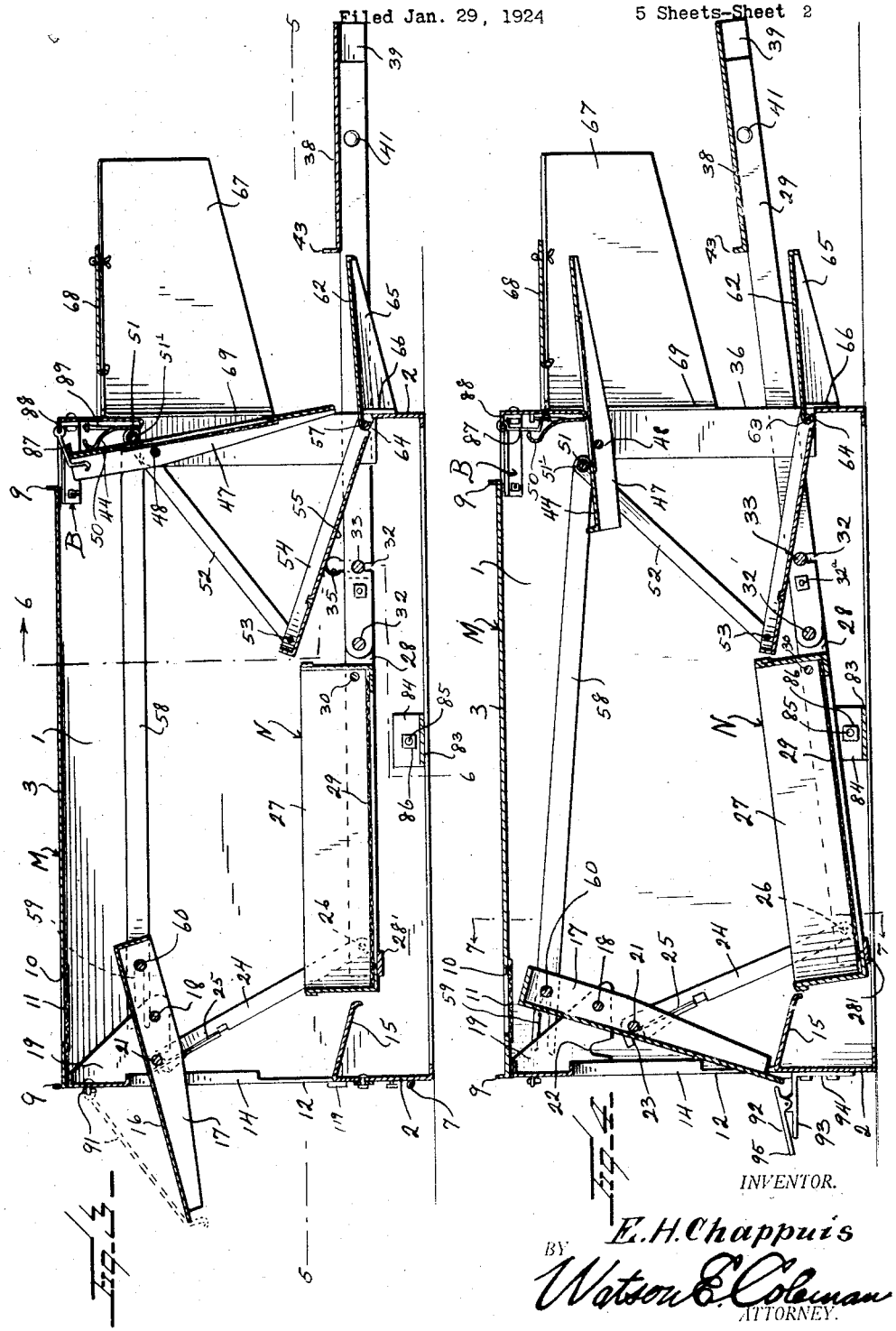

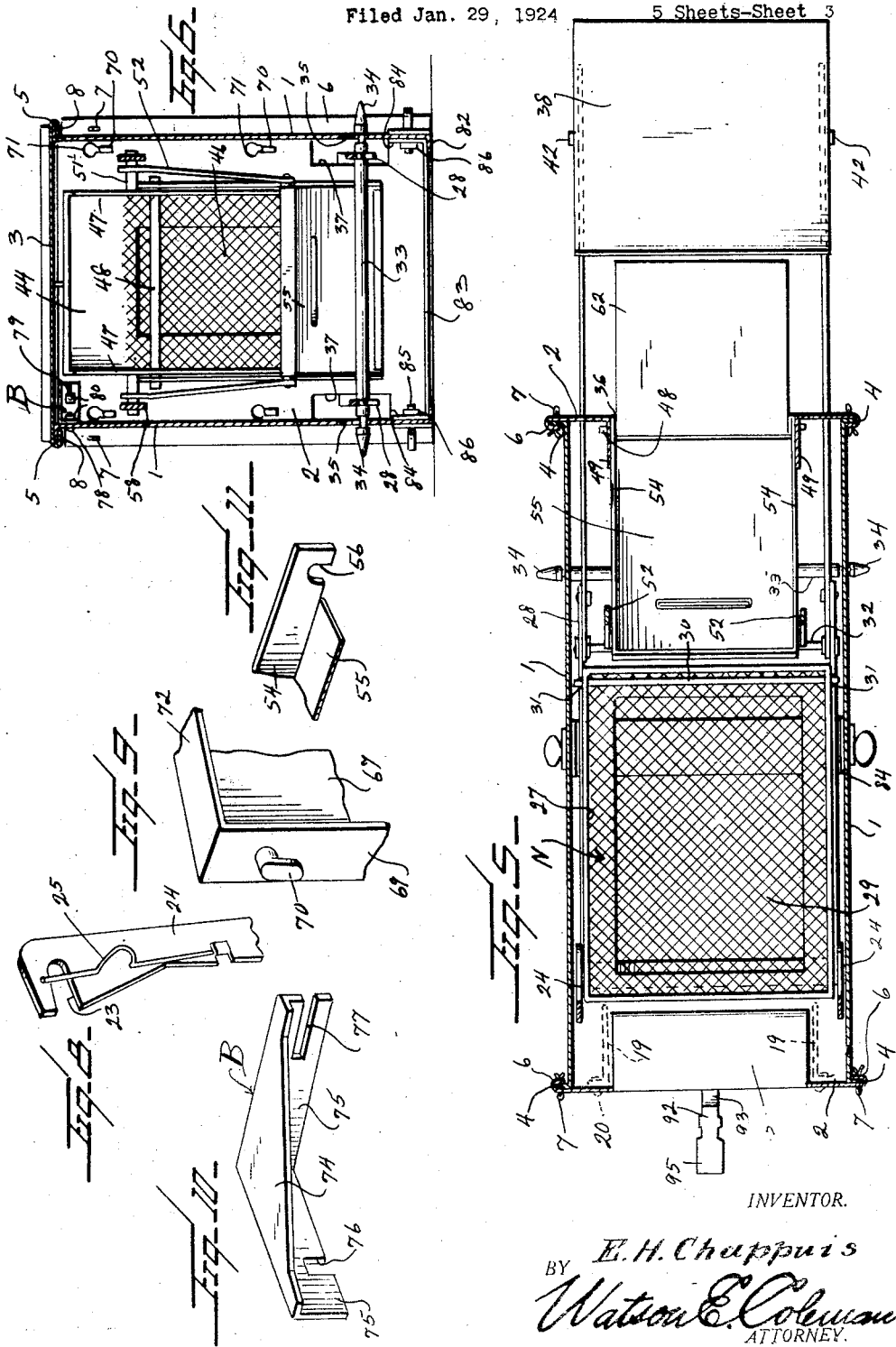

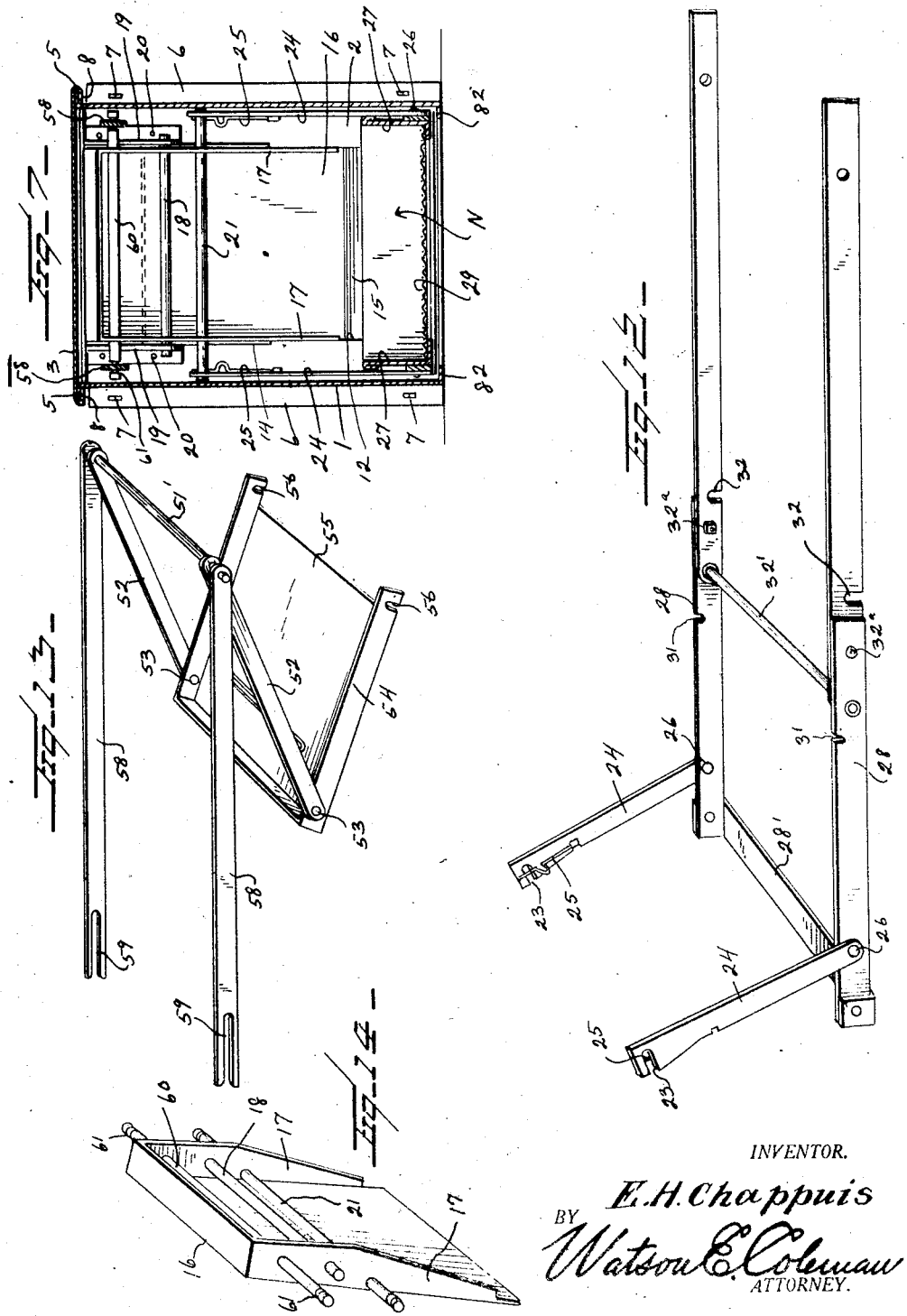

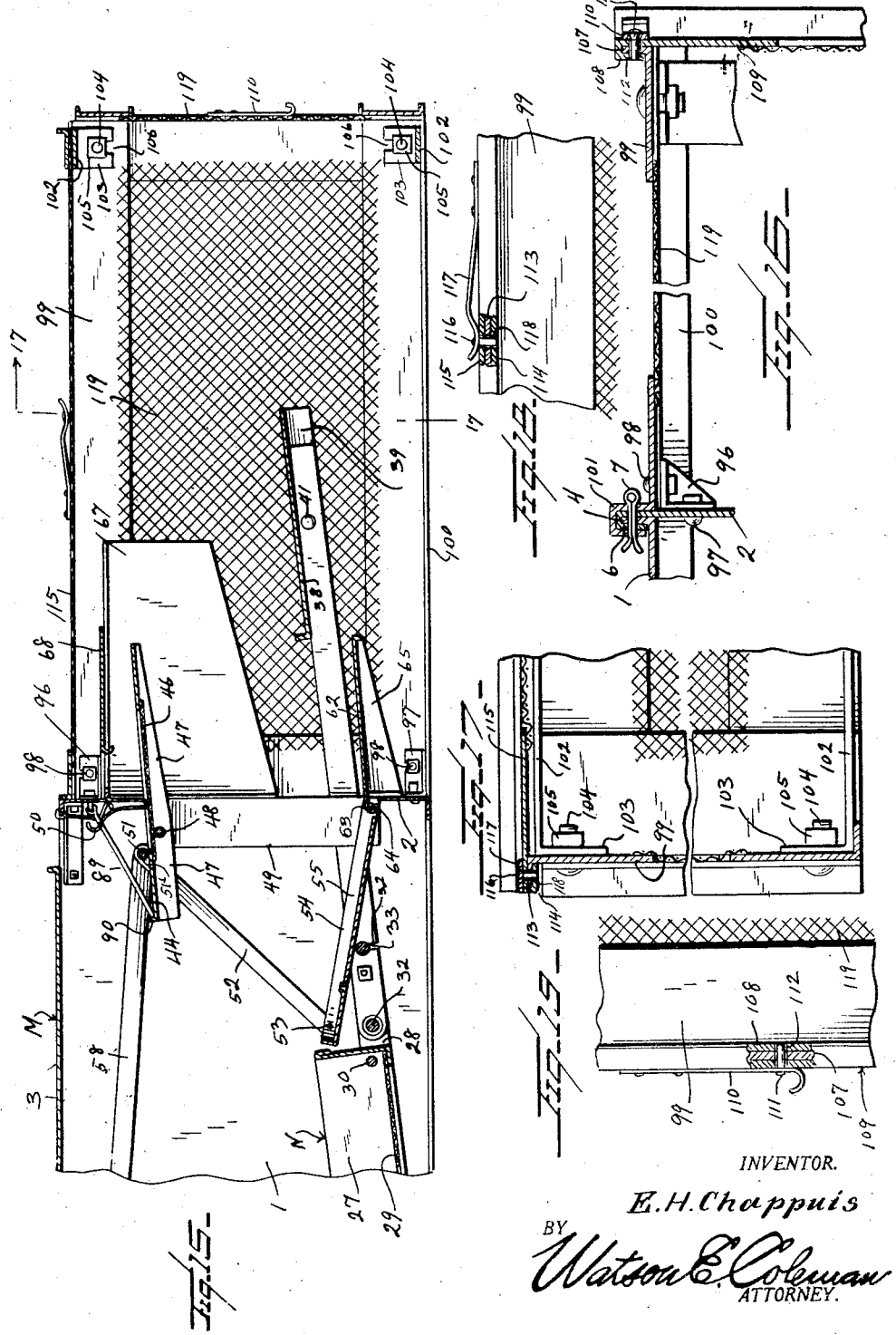

Patented Sept. 15, 1925.

1,553,749

UNITED STATES PATENT OFFICE.

EDWARD HENRY CHAPPUIS, OF MARYSVILLE, CALIFORNIA.

POULTRY EQUIPMENT.

Application filed January 29, 1924. Serial No. 689,323.

*To all whom it may concern:*

Be it known that I, EDWARD HENRY CHAPPUIS, a citizen of the United States, residing at Marysville, in the county of Yuba and State of California, have invented certain new and useful Improvements in Poultry Equipments, of which the following is a specification, reference being had to the accompanying drawings.

This invention relates to certain improvements in poultry equipment and has relation more particularly to a device of this general character of a trap type and it is an object of the invention to provide a device of this general character with novel and improved means whereby the closure members for the entrance and exit may be released by the fowl.

It is also an object of the invention to provide a novel and improved device of this general character which may be readily and conveniently compacted to occupy a minimum of space to facilitate the shipping or storage of the device.

Another object of the invention is to provide a device of this general character embodying novel and improved means whereby the same may be readily and conveniently converted into a brooder.

Furthermore it is an object of the invention to provide a novel and improved device of this general character avoiding the use of springs or other elements or mechanisms which would retard the effectiveness of the device.

The invention also has for its object to provide a novel and improved device of this general character wherein the operating means for the entrance and exit closures are so positioned or arranged with respect to such closures to avoid contact with the fowl when said closure members are in motion.

The invention consists in the details of construction and in the combination and arrangement of the several parts of my improved poultry equipment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:—

Figure 1 is a view in perspective of an equipment constructed in accordance with an embodiment of my invention and viewed from the entrance end thereof;

Figure 2 is a view in perspective of the equipment as illustrated in Figure 1 and viewed from the exit end;

Figure 3 is a longitudinal vertical sectional view taken through the structure as illustrated in Figures 1 and 2 with the closure member for the entrance end in open position, a part for coaction with said closure member being indicated by broken lines;

Figure 4 is a sectional view similar to Figure 3 but showing the parts in their second positions;

Figure 5 is a horizontal sectional view taken substantially on the line 5—5 of Figure 3;

Figure 6 is a transverse vertical sectional view taken substantially on the line 6—6 of Figure 3;

Figure 7 is a sectional view taken substantially on the line 7—7 of Figure 4;

Figure 8 is a fragmentary view in perspective illustrating in detail the means for holding the supporting shaft for the entrance closure member against displacement;

Figure 9 is a fragmentary view in perspective of an inner end portion of a side wall of the hood as herein embodied;

Figure 10 is a view in perspective of the brace member as herein employed;

Figure 11 is a fragmentary view in perspective of the platform as herein disclosed;

Figure 12 is a view in perspective of the supporting structure for the nest proper;

Figure 13 is a view in perspective of the operating unit for the exit closure member;

Figure 14 is a view in perspective of the closure member for the entrance opening;

Figure 15 is a fragmentary longitudinal vertical sectional view illustrating the device assembled for use as a brooder;

Figure 16 is a fragmentary horizontal sectional view taken through the structure as illustrated in Figure 15;

Figure 17 is a sectional view taken substantially on the line 17—17 of Figure 15 looking in the direction of the arrow;

Figure 18 is a fragmentary view partly in side elevation and partly in section illustrating the means for locking the top of the brooder mechanism in applied position;

Figure 19 is a fragmentary view partly in side elevation and partly in section illustrating in detail the means for holding or locking the door of the brooder structure.

As disclosed in the accompanying drawings, M denotes the main housing or body of my improved equipment comprising the side walls 1, the end walls 2 and the top wall 3. Each of the side walls 1 have their end edges defined by the outstanding flanges 4 and their upper edges by the outstanding flanges 5. The vertical edge of each of the end walls 2 is provided with a reverted flange 6 whereby said end wall 2 may be slidably engaged with the flanges 4 at similar ends of the side walls 1 to assemble said end wall in desired position. The applied end wall is maintained against displacement by a cotter pin 7 or other removable holding member disposed through the flanges 4 and 6.

The top member 3 has its side edges provided with the reverted flanges 8 to permit the top member 3 to be slidably engaged with the flanges 5 to suitably position the top member 3 in assembled position. In order to facilitate the desired manipulation of the top member 3 the opposite ends thereof are defined by the upstanding flanges 9 with which the digits of a hand may readily engage. The top member 3 is of a length less than the length of the side walls 1 and when said top member is applied, one end is substantially flush with the entrance of the side walls while the opposite end of the top member is spaced a desired distance inwardly of the exit end of said side walls whereby an opening is provided at said last named end to facilitate ventilation and also to permit access, when desired, to the internal parts of the device adjacent thereto. The central part of the end portion of the applied top member 3 adjacent the entrance end of the device is provided with an opening or window 10 of desired dimensions over which is disposed a reticulated fabric 11 whereby visual access may be had within the main housing or body M and also to provide for requisite ventilation or air circulation.

The end wall 2 at the entrance end of the device is provided with an entrance opening 12 of requisite dimensions and having its lower edge spaced a material distance from the lower edge of said end wall 2. The upper portion of each of the vertical edges of said entrance opening 12 is defined by an inwardly directed flange 14 to minimize the liability of injury to the fowl entering the body or housing through such opening 12. The lower edge of the opening 12 is defined by an inwardly disposed and downwardly inclined shelf or apron 15 which serves to prevent the fowl from perching upon said lower edge of the opening and thereby assure the desired entry within the body or housing.

Associated with the entrance opening 12 is a closure member 16 comprising a plate of requisite dimensions and which is of a width to fit substantially snug within the opening 12 but permitting said member 16 to have free swinging motion. Each of the side edges of the member 16 is defined by an inwardly disposed flange 17 preferably gradually increasing and disposed through the upper portions of said flanges 17 and extending transversely thereof is a supporting rod or pintle 18, each extremity of which being operatively engaged with an inwardly disposed bracket 19 secured to the upper portion of the associated end wall 2. A bracket 19 is positioned at each side of the entrance opening 12, as indicated by dotted lines in Figure 5 and having a flanged margin secured to said end wall 2 by the rivets 20 or the like. Each of the brackets 19 is substantially in the form of a right triangle with its lower or based portion terminating below the upper edge of the opening 12 and with the rod or pintle 18 engaged therewith at a point adjacent the outer or free portion of its base.

The rod or pintle 18 supports the closure member 16 for swinging movement in a vertical direction and the upward swinging movement of said member 16 is limited by an extended end portion of a rod 21 being received within a pocket or recess 22 suitably positioned within the lower marginal portion of the adjacent bracket 19. The rod 21 is also disposed transversely of the member 16 and is positioned below or inwardly of the rod 18. This rod extends through and is supported by the flanges 17.

Each extended end portion of the rod 21 is also adapted to be received within a transversely disposed notch or recess 23 provided in the upper end portion of a link or lever 24. Carried by the link or lever 24 is a spring 25 bridging the notch or recess 23 and having contact with the adjacent portion of the rod 21 whereby the link or lever 24 and the rod 21 are maintained in desired assembled relation yet readily disengaged or separated when required.

The opposite or lower end portion of the link or lever 24 is pivotally connected, as at 26, to the inserted end portion of the rock levers 28. The inserted end portions of the rock levers 28 are connected by a cross member 28' upon which rests an end portion of the nest N. One end of the nest is in close proximity to the shelf or apron 15 as is clearly illustrated in the accompanying drawings. The nest N as herein disclosed has a reticulated bottom wall 29. This bottom serves to reduce to a minimum the liability of the eggs breaking when dropped and also assures a well aerated or ventilated nest at all times whereby the same is prevented from becoming damp and minimizes the collection of excrete, etc. It is also to be noted that the walls of the nest are assembled in a manner to avoid crevices or the like so that the collecting of vermin is substantially avoided.

The outer end of the nest N has disposed therethrough a rod 30 which extends beyond opposite sides of the nest, said extended portions being received within the recesses 31 suitably produced in the upper marginal portion of the rock levers 28 whereby the nest N is maintained in desired assembled position. The particular means herein disclosed for supporting the nest N in applied position permits the same to be readily removed and replaced as the occasions of practice may necessitate. Each of the rock arms 28 at a desired point intermediate the ends thereof is provided in its lower marginal portion with the recess 32 whereby said rock arms are engaged from above with the supporting rod or member 33. The rod 33 is of a length to extend through the side walls of the main body or housing M and terminates in the heads 34, the side walls 1 being provided with the buttonhole slots 35 to permit the desired application or removal of said rod and for which reason the restricted portion of each of said slots 35 is downwardly disposed.

The levers 28 are of a length, when in applied position, to extend a predetermined distance outwardly of or beyond the end wall 2 of the body M provided with the exit opening 36, said end wall 2 at opposite sides thereof but adjacent the bottom thereof being provided with the vertically disposed elongated openings or slots 37 through which said levers 28 extend.

The levers 28 may be termed the basic levers and supported by the outer or extended end portions thereof is a platform 38 having its side marginal portions defined by the depending flanges 39 which overlie the adjacent portions of the levers 28. Each of the flanges 39 is provided with a longitudinally disposed slot 40 of desired length through which is disposed an outstanding bolt 41 carried by the adjacent lever 28 and threaded upon said bolt 41 and engaging the flange 39 from without is the nut 42 whereby the platform 38 may be maintained in any desired adjustment intermediate the ends of the slot 40. By this means the desired adjustment of the platform 38 may be had in order to effect the required operation of the mechanism.

The inner margin of the platform 38 is defined by an upstanding flange 43 to facilitate the effecting of the desired adjustment of said platform with respect to the levers 28.

Associated with the exit opening 36 is a closure member 44 provided with a window 45 over which is disposed a reticulated fabric 46, said window affording the requisite admission of light to cause the fowl to move in direction of the exit opening after leaving the nest.

The side marginal portions of the closure member 44 are defined by the inwardly disposed flanges 47 and disposed transversely of the closure member 44 adjacent the upper portion of the window and disposed through the flanges 47 is the supporting rod or pintle 48. This rod or pintle 48 extends beyond the opposite sides of the closure member 44 and the extended portion thereof is disposed through the upper end portions of the inwardly disposed flanges 47 defining the sides of the exit opening 36. By this means the member 44 is supported for swinging movement in a vertical direction, the opening movement being upward from below through said opening 36. The closing movement of the member 44 is limited by contact of the upper portion thereof with the upstanding spring member or bumper 50.

Disposed transversely of the closure member 44 and interposed between said member and the adjacent end wall 2 is a rod 51 of a length to extend beyond the opposite sides of the member 44. Pivotally engaged with each extremity of the rod 51 is a lever or link 52 also pivotally engaged, as at 53, with the side flange 54 of the platform 55. The side flanges 54 extend beyond an end of the platform 55 and said extended portions are provided in their lower marginal portions with the recesses 56, in which is adapted to be engaged from below a rod 57 disposed across the lower portion of the exit opening 36 and supported by the flanges 49.

The closure member 44 moves by gravity into closed position. When the fowl leaves the nest N and mounts upon the platform 55 such weight will, through the levers or links 52, impose requisite pull on the rod 51 to cause the closure member 44 to swing into raised or open position as is illustrated in Figure 4 of the accompanying drawings.

Operatively connected with the extremities of the rod 51 outwardly of the levers or links 52 are the elongated levers 58. The extremities of the levers 58 remote from the rod 51 are provided with the longitudinally disposed open slots 59 which receive the extremities of the rod 60 disposed transversely of the closure member 16 above the rod or pintle 18, said extended portions of the rod 60 being provided with the annular grooves 61 in which are engaged the marginal portions of the levers 58 defining the longitudinal walls of the slots 59 whereby the levers 58 are effectively maintained in operative engagement with the rod 60.

Under normal conditions, the closure member 16 is initially open with the member 44 in closed position. As the fowl enters the main body or housing M and occupies the nest N the resultant depression or downward movement of the nest N will cause the member 16 to assume a closed position the requisite movement of the door being permitted without hindrance being offered thereto by the levers 58 owing to the pivotal connection of said levers 58 with the rod 51 together with the slots 59.

With the member 16 in closed position the fowl can only make its escape through the exit opening 36 and as the fowl leaves the nest N it passes over the platform 55 with the result that the weight of the fowl will depress said platform 55 resulting in the requisite pull being imposed upon the rod 51 to swing the closure member 44 into its upper or open position as illustrated in Figure 4. As the fowl passes out through the exit opening 36 it also travels over the platform 38 with the result that the weight of the fowl on the platform 38 will swing the inner portions of the basic levers 28 and the nest N upward resulting in the links or levers 24 to move or raise the closure member 16 in open position.

When the member 16 is in closed position and the member 44 in open position the extremities of the rod 60 are immediately adjacent the inner or closed ends of the slots 59 so that as the member 16 swings upwardly into open position the inward swinging movement of the upper portion of said member will result in the rod 60 forcing the levers 58 in a direction toward the exit opening a distance sufficiently to bring the rod 51 past the rod 48 whereupon the closure member 44 will drop into closed position, such movement being materially facilitated by the weight of the rod 51 and the parts associated therewith.

Substantially bridging the space between the inner end of the platform 38 and the adjacent end wall 2 is a platform 62 of a width substantially equal to the width of the exit opening 36 and the inner end of said platform 62 is provided with an extension 63 terminating in an inwardly and downwardly curved flange 64 adapted to hook over the pin 57 from above whereby the platform 62 is detachably held in applied position.

Each side margin of the platform 62 is substantially defined by a depending flange 65 provided at its inner end with an inturned flange 66 which engages with the outer face of the end wall 2 below the opening 36 whereby the platform 62 is effectively held in desired assembled position.

Associated with the upper portion of the exit opening 36 and serving to assure the proper travel of the fowl upon the platform 38 is a removable hood comprising the side plate 67 and a top plate 68. Each of the side plates 67 is provided at its inner end with an inturned flange 69 and carried by said flange 69 are outstanding and downwardly facing hook members 70 adapted to be disposed through the buttonhole slots 71 formed in the exit end wall 2 at opposite sides of the opening 36. By this means each of the side plates 67 is effectively maintained in assembled position and may be readily removed as required.

The upper edges of the side plates 67 of the hood are defined by the inturned flanges 72 upon which rest the opposite end portions of the top plate 68, said top plate being secured to the flanges 72 through the medium of the removable attaching members 73 such as cotter pins or the like.

To further assure the requisite rigidity of the assembled structure and particularly of the main body or housing M, I find it of advantage to provide a brace member B (Figure 10) which, as herein disclosed, comprises a substantially right triangular plate 74 having its outer edges defined by the depending flanges 75, one of said flanges having formed therein from below a notch or recess 76 while the outer end of the second flange 75 is provided with a longitudinally disposed open slot 77. This brace member is operatively engaged with a side wall 1 and an end wall 2 preferably the exit end wall, and a bolt 78 is directed through the side wall 1 from without and is received within the notch or recess 76 while the bolt 79 disposed through the end wall 2 is received within the slot 77. Associated with each of the bolts 78 and 79 is a clamping nut 80. The notch or recess 76 and the slot 77 facilitate the application or removal of the brace B.

I also find it of advantage to provide the central portion of the top plate 68 of the hood with the notch or recess 81 which provides means to permit a convenient and effective hand hold on the device in its entirety.

The lower marginal portions of the side walls or members 1 are also defined by the inwardly disposed flanges 82 and bridging the space between said side walls or members 1 and resting upon the flanges 82 is a tie bar 83 provided at its opposite ends with the perpendicularly related flanges 84 which contact with the inner faces of the walls or members 1. Disposed through said walls or members 1 and the flanges 84 is a bolt 85 the inner extremities of said bolt having operatively engaged therewith the clamping nuts 86.

The closure member 44 may be held against upward or opening movement through the medium of a hook member 87 operatively engaged with the central portion of an inturned flange 88 carried by the exit end wall or member 2 and which hook member 87 engages over the upper portion of the closure member 44 when in closed position.

The closure member 44 may also be effectively maintained in open position through the instrumentality of an elongated rod 89 pivotally engaged with the upper portion of the adjacent end wall 2 and which is adapted to engage an outstanding flange 90 defining the upper edge of the closure member 44, as illustrated in Figure 15 of the accompanying drawings.

The closure member 16 at the entrance end of the main body or housing M is also adapted to be held in open position through the instrumentality of a hook member 91 operatively engaged with the adjacent entrance end wall or member 2 and which hooks over the lower edge portion of the closure member 16, as illustrated by broken lines in Figure 3, to maintain said closure member 16 open.

The closure member 16 may also, when desired, be held against upward or opening movement through the medium of the latch 92, said latch being pivotally engaged with an outstanding arm 93 of a bracket 94 fixed to the entrance end plate or wall 2 at a point below the entrance opening 12 and substantially at the transverse center thereof. As is illustrated in the accompanying drawings the latch 92 is normally disposed on an upward and inward incline so that the lower end portion of the closure member 16 may readily pass thereover when moving downwardly into closed position but when said closure member 16 passes over the latch 92 the working end of the same will swing upwardly by gravity, as particularly afforded by the tail portion 95, into a position to effectively hold or lock the closure member 16 against upward or opening movement.

The device in its entirety can be readily knocked down or collapsed for shipment or storage and assembled with equal facility. With the device assembled the same can be readily knocked down by first removing the top plate 3 and the platform 38. The levers or links 24 are then disengaged from the rod 21 and are caused to drop or swing to a position in substantially parallelism with the levers 28. The levers 58 are disengaged from the rod 60 and the rod 51 lifted out of position with respect to the closure member 44. The hood is readily detached and collapsed and the nest N can be conveniently removed. The levers 28, after the nest N is removed, are unseated upon the rod 33 and withdrawn out through the exit opening 36. The end members or walls 2 are then disengaged from the side members or walls 1 after withdrawing the holding member 7. It is to be understood, of course, that the brace B is first removed. The supporting rod or member 33 is then disengaged or removed from the side members or walls 1 together with the tie bar 83. After these operations the device may be compacted to occupy a minimum of space for either storage or shipment.

When the device is used as a hatching nest the latch 92 is brought into play to obviate the liability of disturbance to the occupant of the nest and the exit member 44 is secured in either open or closed position as per requirements. With both of these members closed the occupant is confined to the nest N.

When the device is adapted to be employed as a brooder, the angular brackets 96 are bolted, as at 97, to the exit end wall or member 2 at opposite sides thereof and adjacent the top and bottom of said wall. Each of said brackets being adapted to be bolted or otherwise secured, as at 98 to the inner end portion of a side wall 99 of the brooder proper. The lower marginal portion of each of the side walls 99 is defined by an inwardly disposed flange 100 while the inner vertical end of said wall is defined by a reverted flange 101 adapted to receive the reverted flange 6 of the applied exit end wall or member 2. The fastening member 7 hereinbefore referred to being also employed to effect the desired securement of the flanges 100 to the flange 6. It is to be understood that the bolts 98 are not applied until after the side members 99 have been initially assembled in working position. After the side members 99 have been properly applied, the upper and lower tie bars 102 are interposed between upper and lower portions of the outer ends of said side members 99, each of said tie bars 102 having an angular flange 103 contacting with the inner face of a side member 99 and through which member and flange 103 is directed a bolt 104 having associated therewith a holding or clamping nut 105. The bolt 104 is preferably disposed through an open slot 106 provided in said flange 103 to facilitate the application or removal of the bars 102.

The outer end of each of the side members 99 is provided with an outstanding flange 107 which interlocks a reverted flange 108 carried by an end of a vertical sliding closure member or door 109. The side portion of the door carries a spring 110 provided with an inwardly disposed pin 111 adapted to be disposed through registering openings 112 in the flanges 107 and 108 whereby the door is effectively locked against vertical sliding movement.

The door 109 may be maintained closed to prevent the escape of the chicks and hen or if preferred may be adjusted upwardly for a distance sufficient to provide for the ingress and egress of the chicks yet confining the hen. The upper longitudinal edge of each of the side members 99 is defined by an outstanding flange 113 which interlocks with a reverted flange 114 carried by the side marginal portion of the brooder top 115. The top 115 is slidably adjusted into position but is held against displacement by the locking pin 116 carried by the spring 117, said pin being adapted to be inserted through registering openings 118 in the flanges 113 and 114. The side members 99, the door 109 and the top 115 of the brooder each preferably has its central portion open with a reticulated fabric 119 disposed over such opening whereby effective ventilation is assured.

When the device is used as a brooder it is preferred that the closure member 16 for the entrance opening be closed and with the closure member 44 maintained in open position, so that the hen and chicks will have free passage into or out of the main body or housing M.

Associated with the rock levers 28 is an intermediate rod 32', providing means to facilitate folding of said levers upon removal of the bolts 32ª. The rod 51 hereinbefore referred to has loosely mounted thereon a sleeve 51', and which coacts with the exit closure member 44 to minimize friction.

The lower portion of the closure member 16, when moving into closed position, comes into contact with the resilient bumpers 120 as illustrated in Figure 1, said bumpers being resilient and serving to absorb shock and noise.

From the foregoing description it is thought to be obvious that a poultry equipment constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A device of the class described comprising, in combination, a housing provided with an entrance opening and a separate exit opening, a swinging closure member associated with the entrance opening, a swinging closure member associated with the exit opening, means operable under weight to move the first named closure member into closed position, a depressible platform within the housing, a rod extending above the second closure member above its mounting, links connecting the platform and the rod to move the second closure member into open position upon depression of the platform, and levers operatively engaged with the rod and extending toward the first named closure member, said first named closure member having outstanding parts, the adjacent extremities of the levers being provided with longitudinally disposed slots through which said outstanding parts extend.

2. A device of the class described comprising, in combination, a housing provided with an entrance opening and a separate exit opening, a swinging closure member associated with the entrance opening, a swinging closure member associated with the exit opening, means operable under weight to move the first named closure member into closed position, a depressible platform within the housing, a rod extending above the second closure member above its mounting, links connecting the platform and the rod to move the second closure member into open position upon depression of the platform, levers operatively engaged with the rod and extending toward the first named closure member, said first named closure member having outstanding parts, the adjacent extremities of the levers being provided with longitudinally disposed slots through which said outstanding parts extend, the first named closure member being normally open, and the second named closure member being normally closed, and weight operated means positioned exteriorly of the housing for returning said closure members to their normal positions.

3. A device of the class described comprising a housing provided with an entrance opening and a separate exit opening, a normally open closure member for the entrance opening, weight operated means for moving said closure member into closed position, a normally closed closure member for the exit opening, weight operated means for moving said second closure member into open position, weight operated means for moving both of said closure members to their normal position, and an outstanding hood carried by the housing and associated with the exit opening, said last named means including a depressible platform positioned in advance of the exit opening and spaced therefrom, and a platform positioned beneath the hood and substantially bridging the space between said exit opening and the first named platform.

4. A device of the class described comprising, in combination, a housing provided with an entrance opening and a separate exit opening, a swinging closure member associated with the entrance opening, a swinging closure member associated with the exit opening, levers extending within the housing and disposed beyond the wall provided with the exit opening, means for supporting said levers for rocking movement, an operative connection between the levers and the closure member for the entrance opening for moving said closure member into closed position upon depression of the inner end portions of the levers and moving said closure member into open position upon depression of the outer end portions of said levers, a depressible platform with the housing, a rod extending above the second closure member above its mounting, links connecting the platform and the rod to move the second closure member into open position upon depression of the platform, and additional levers operatively engaged with the first named closure member to move the second closure member in closed position upon movement of the first named closure member into open position.

In testimony whereof I hereunto affix my signature.

EDWARD HENRY CHAPPUIS.